US010180085B2

United States Patent
Trippold et al.

(10) Patent No.: US 10,180,085 B2
(45) Date of Patent: Jan. 15, 2019

(54) COMBINED CYCLE POWER PLANT

(71) Applicant: General Electric Technology GmbH, Baden (CH)

(72) Inventors: Siegfried Trippold, Bad Saeckingen (DE); Andre Koenig, Waldshut-Tiengen (DE); Atish Dipankar Roy Choudhury, Nussbaumen (CH); Patrice Richard Cantin, Bussy (CH); Reza Alikhani, Baden (CH); Prashant Agrawal, Wettingen Aargau (CH)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 15/237,432

(22) Filed: Aug. 15, 2016

(65) Prior Publication Data

US 2017/0051635 A1    Feb. 23, 2017

(30) Foreign Application Priority Data

Aug. 20, 2015 (EP) .................... 15181820

(51) Int. Cl.
*F01K 23/10* (2006.01)
*H02K 7/18* (2006.01)
(Continued)

(52) U.S. Cl.
CPC ............ *F01K 23/10* (2013.01); *F01K 23/106* (2013.01); *F01K 23/16* (2013.01); *F02C 6/00* (2013.01); *H02K 7/1823* (2013.01); *Y02E 20/16* (2013.01)

(58) Field of Classification Search
CPC ......... Y02E 20/16; F01K 23/10; F01K 23/16; F01K 23/106; F02C 6/00
See application file for complete search history.

(56) References Cited

U.S. PATENT DOCUMENTS 6,178,734 B1    1/2001  Shibuya et al.
6,338,241 B1 *  1/2002  Shibuya ................ F01K 23/106
                                            60/39.182
(Continued)

FOREIGN PATENT DOCUMENTS

WO    2012045689 A1    4/2012

OTHER PUBLICATIONS

European Search Report and Written Opinion dated Jan. 25, 2016 which was issued in connection with EP Patent Application No. 15181820.0 which was filed on Aug. 20, 2015.
(Continued)

*Primary Examiner* — Carlos A Rivera
*Assistant Examiner* — Thuyhang Nguyen
(74) *Attorney, Agent, or Firm* — GE Global Patent Operation; Marc A. Vivenzio

(57) ABSTRACT

A combined cycle power plant is described, comprising a steam turbine, a first heat recovery steam generator and a second heat recovery steam generator. The first heat recovery steam generator is attached to the steam turbine by a first steam pipe system and the second heat recovery steam generator is attached to the steam turbine by a second steam pipe system, to allow steam to pass from the first and second heat recovery steam generators to the steam turbine. The steam turbine is arranged in between the first heat recovery steam generator and the second heat recovery steam generator.

7 Claims, 3 Drawing Sheets

(51) Int. Cl.
*F02C 6/00* (2006.01)
*F01K 23/16* (2006.01)

(56) References Cited

U.S. PATENT DOCUMENTS

| | | | |
|---|---|---|---|
| 7,131,259 B2* | 11/2006 | Rollins, III | F01K 23/105 60/39.182 |
| 2010/0263376 A1 | 10/2010 | Smith | |
| 2010/0281844 A1 | 11/2010 | Sholes et al. | |

OTHER PUBLICATIONS

PEI Magazine: "State-of-the art CCPP fires Oman's new aluminum smelter", Special Report Oct. 2009.

* cited by examiner

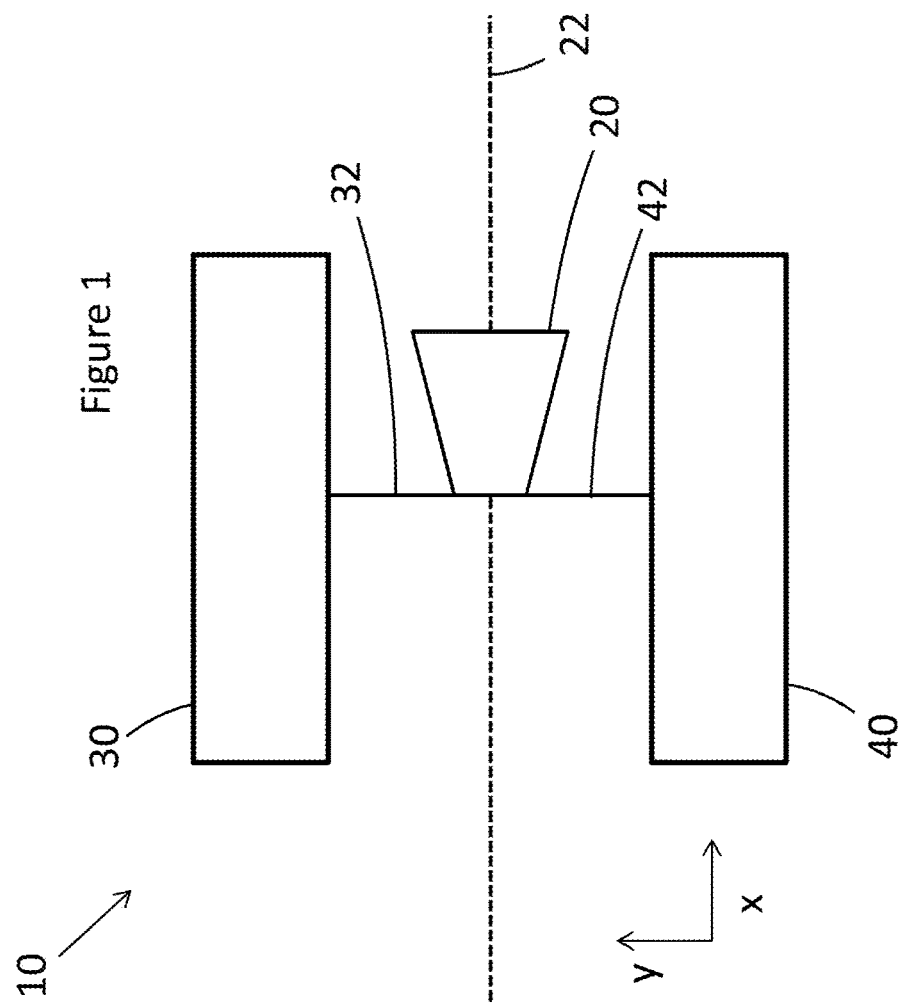

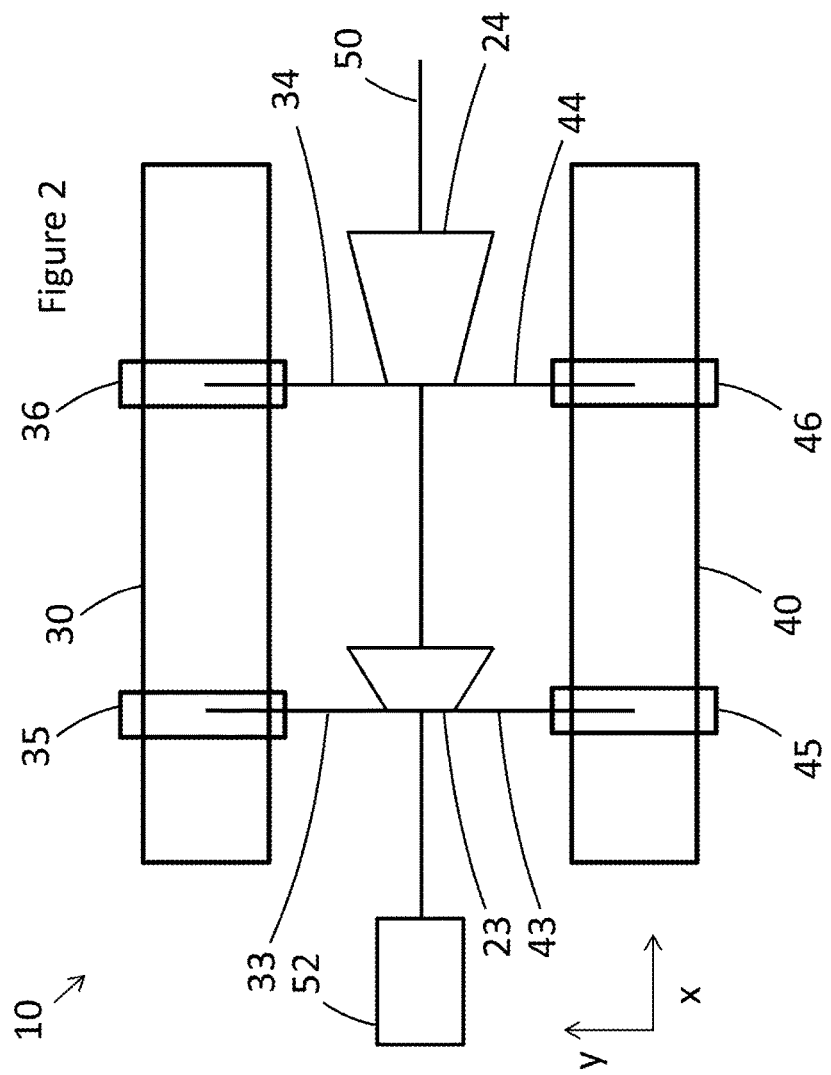

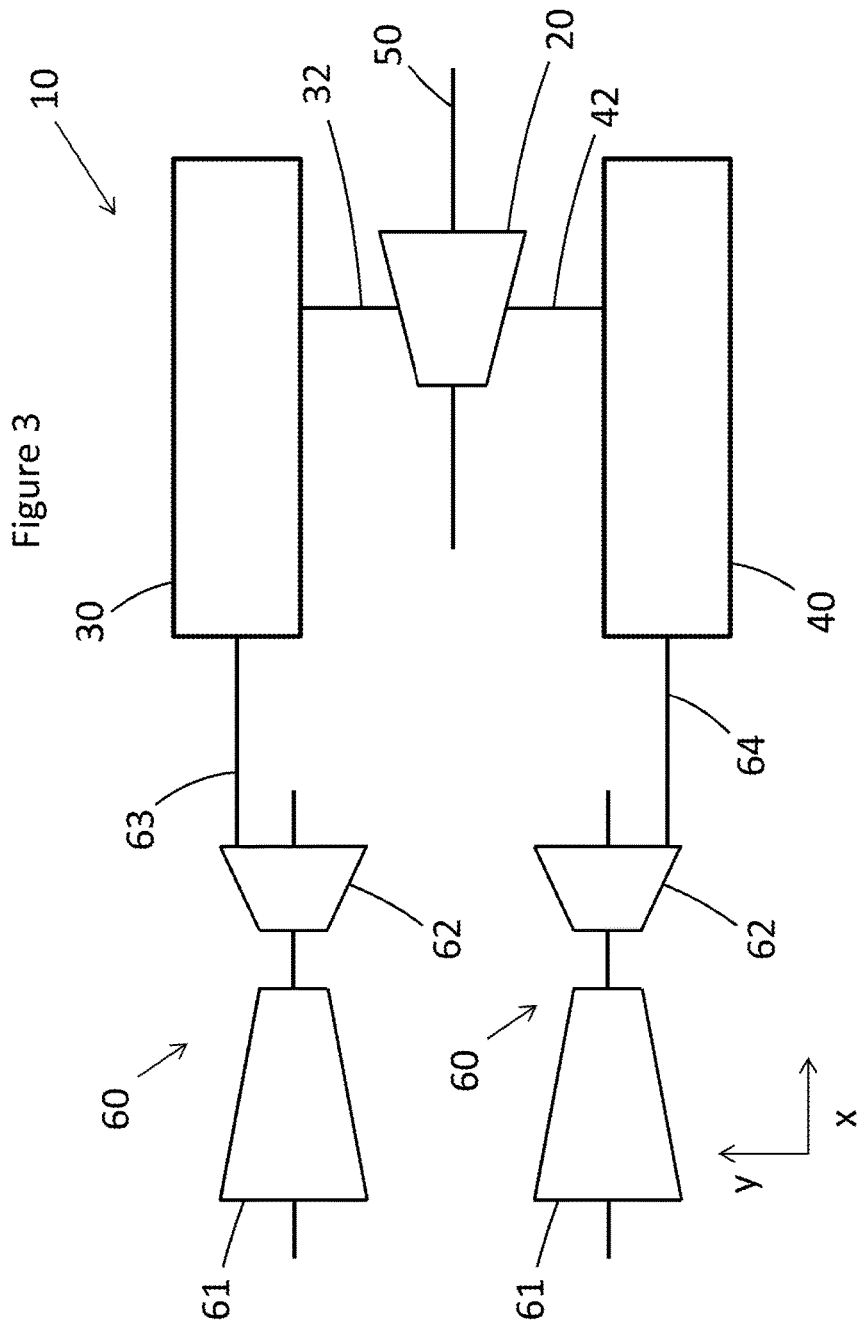

COMBINED CYCLE POWER PLANT

TECHNICAL FIELD

The present disclosure relates to combined cycle power plants, and more particularly, to combined cycle power plants including a steam turbine, a first heat recovery steam generator, and a second heat recovery steam generator.

BACKGROUND OF THE INVENTION

In existing multi-shaft combined cycle power plants (CCPPs), steam turbines are typically arranged apart from the heat recovery steam generators (HRSGs) that supply them. It has been appreciated, however, that the arrangement of steam turbines with respect to heat recovery steam generators in CCPPs can be improved.

BRIEF DESCRIPTION

A first aspect provides a combined cycle power plant including a steam turbine, a first heat recovery steam generator and a second heat recovery steam generator. The first heat recovery steam generator is attached to the steam turbine by a first steam pipe system and the second heat recovery steam generator is attached to the steam turbine by a second steam pipe system to allow steam to pass from the first and second heat recovery steam generators to the steam turbine. The steam turbine is arranged in between the first heat recovery steam generator and the second heat recovery steam generator.

This can provide increased flexibility in arrangement of systems and equipment by optimized and compact arrangements. In particular, compared to existing designs, this layout can further optimize (reduce) the ground footprint, it can eliminate some of the previously required building structures, it can reduce duplication of auxiliary systems and/or structures such as lubrication oil modules, it can reduce the need for civil concrete works, it can reduce site activities due to reductions in the quantity of material required, and it can provide additional space for maintenance. Compared to existing designs, this layout can also simplify the procurement and installation process. It can also reduce part stress, reduce pressure drop (e.g. from the steam turbine to the HRSG), and reduce the length of steam pipes required. Overall, it can improve performance and efficiency. Optional features of the invention as detailed below can help to provide these advantages.

In one embodiment, the first steam pipe system and the second steam pipe system are symmetrical to one another relative to a steam turbine rotation axis. Although the requirement for two mirrored designs for some units and components increases complexity, it has been appreciated that this disadvantage can be outweighed by the various benefits described elsewhere in the application.

In one embodiment, the first steam pipe system is attached to the first heat recovery steam generator at a central point of the first heat recovery steam generator, the point being central in a direction (y) perpendicular to the steam turbine rotation axis, and the second steam pipe system is attached to the second heat recovery steam generator at a central point of the second heat recovery steam generator, the point being central in a direction (y) perpendicular to the steam turbine rotation axis. Providing a central point for steam pipe systems on the HRSGs can allow for a single HRSG design.

In one embodiment, the steam turbine is a first steam turbine and the combined cycle power plant includes a second steam turbine configured and arranged to work at a lower pressure than the first turbine. The first heat recovery steam generator includes a first area and a second area, wherein the second area is configured and arranged to function at a lower pressure than the first area. The second heat recovery steam generator includes a first area and a second area, wherein the second area is configured and arranged to function at a lower pressure than the first area. The first steam turbine is adjacent to the first area in the first heat recovery steam generator and the first area in the second heat recovery steam generator, and the second steam turbine is adjacent to the second area in the first heat recovery steam generator and the second area in the second heat recovery steam generator. This can minimize the distances travelled by steam between the HRSGs and the steam turbines, and can minimize pressure drops.

In one embodiment, the first steam turbine is a high-pressure steam turbine, the second steam turbine is an intermediate-pressure steam turbine, the first area and second area of the first heat recovery steam generator are a high-pressure area and an intermediate-pressure area respectively, and the first area and the second area of the second heat recovery steam generator are a high-pressure area and an intermediate-pressure area respectively. In one embodiment, the combined cycle power plant is a multi-shaft combined cycle power plant. In an embodiment, the multi-shaft combined cycle power plant includes a first gas turbine attached to the first heat recovery steam generator to allow exhaust gases from the gas turbine to flow to the first heat recovery steam generator, and a second gas turbine attached to the second heat recovery steam generator to allow exhaust gases from the gas turbine to flow to the second heat recovery steam generator, wherein the combined cycle power plant is arranged as a multi-shaft combined cycle power plant, with the steam turbine on a first shaft, the first gas turbine on a second shaft and the second gas turbine on a third shaft In one embodiment, the first steam turbine is a high-pressure steam turbine, and the combined cycle power plant includes, on a single shaft, a generator, the high-pressure steam turbine, an intermediate-pressure steam turbine, a first low-pressure steam turbine and a second low-pressure steam turbine.

BRIEF DESCRIPTION OF THE DRAWINGS

An embodiment of the invention will now be described by way of example only and with reference to the accompanying drawings in which:

FIG. 1 is a top view of a power plant;
FIG. 2 is a top view of another power plant; and
FIG. 3 is a top view of a third power plant.

DETAILED DESCRIPTION

FIG. 1 shows part of a combined cycle power plant 10, including a steam turbine 20, a first heat recovery steam generator (first HRSG) 30 and a second heat recovery steam generator (second HRSG) 40. The first and second HRSGs are arranged on either side of the steam turbine 20. The first and second HRSGs are placed adjacent to the steam turbine and on opposite sides of the rotation axis 22 of the steam turbine. The steam turbine 20 is attached to the first HRSG by a first steam pipe system 32, and to the second HRSG by a second steam pipe system 42. The steam pipe systems 32, 42 transport steam between the HRSGs 30, 40 and the steam turbine 20.

FIG. 2 shows another example of a combined cycle power plant 10. Instead of only one steam turbine as shown in FIG. 1, a high-pressure (HP) steam turbine 23 and an intermediate-pressure (IP) steam turbine 24 are provided. One, two or more low-pressure (LP) steam turbines (not shown) can also be provided downstream of the IP steam turbine 24. A HP steam pipe system is split into a first HP steam pipe system 33 and a second HP steam pipe system 43, and an IP steam pipe system is split into a first IP steam pipe system 34 and a second IP steam pipe system 44.

The first HP steam pipe system 33 connects a first area (e.g. HP area 35) of the first HRSG 30 to the HP steam turbine 23, and the second HP steam pipe system 43 connects a first area (e.g. HP area 45) of the second HRSG 40 to the HP steam turbine 23.

The first IP steam pipe system 34 connects a second area (e.g. an IP area 36) of the first HRSG 30 to the IP steam turbine 24, and the second IP steam pipe system 44 connects a second area (e.g. an IP area 46) of the second HRSG 40 to the IP steam turbine 24.

In an embodiment, as shown in FIG. 2, some or all of the steam pipe systems 33, 34, 43, 44 are connected to the center of the HRSGs, as this allows for the first and second HRSGs to be the same design.

The HP steam turbine 23 and the IP steam turbine 24 are arranged on a shaft 50. A generator 52 is also arranged on the shaft 50.

FIG. 3 shows a combined cycle power plant with two gas turbines 60, each including a compressor 61, a combustor (not shown) and a turbine 62. The gas turbines 60 are attached to the first and second HRSGs 30, 40 by lines 63, 64, which transport the turbine exhaust gases to the first and second HRSGs 30, 40 respectively. Auxiliary equipment can be arranged adjacent to and/or above the gas turbine.

The steam pipe systems are configured and arranged to direct steam between the various parts as appropriate. The entry points (which may be central points) where the steam pipe systems are attached to the HRSGs allow steam to pass out of the HRSGs and through the steam pipe systems to the steam turbines. The heat required to produce steam in the HRSGs may be produced using the waste heat from a gas turbine, for example.

The combined cycle power plant is normally laid out with the rotation axis 22 of the steam turbine extending horizontally in an x direction (see FIG. 2, for example). A y direction is at right angles to the x direction, and the x and y directions lie in a horizontal plane. A z direction extends at right angles to both the x and y directions, and is therefore vertical.

The combined cycle power plant may be, for example, a combination of one or more gas turbines with one or more steam turbines; for example, a gas turbine, a HP steam turbine, an IP steam turbine and two LP (low-pressure) steam turbines. A single-shaft or a multi-shaft arrangement can be used. In a multi-shaft arrangement, two or more separate shafts may be provided, each with one or more turbines (steam turbines, gas turbines), such as in FIG. 3. Each shaft would normally have a separate generator. A single-shaft layout, with more than one turbine (steam turbine, gas turbine) on the same shaft can also be used, for example with a gas turbine on the same shaft as a HP steam turbine and an IP steam turbine.

Generally, the steam turbine is centered in between the first and second HRSGs; that is, the first HRSG is the same distance away from the steam turbine as the second HRSG. In this case, the position of the HRSGs is symmetrical relative to the steam turbine rotation axis 22, with each HRSG being the same distance from the steam turbine rotation axis. The HRSGs and/or the steam pipe systems on the opposite sides of the steam turbine rotation axis 22 can be mirrored relative to the steam turbine rotation axis 22. The shaft 50, and therefore also the steam turbine rotation axis 22, normally extends between the first HRSG and the second HRSG. Generally, the first and second HRSGs extend parallel to the steam turbine rotation axis 22, as shown in the Figures.

The steam turbine may be mounted on a table. In such a design, the steam turbine may be on the top floor of a table structure. The lower floor (normally at ground level) may be available for access, for example for delivering parts during construction and maintenance. An intermediate floor or floors may house auxiliaries, for example. The upper floor of the table may be approximately 20 m above the lower floor, although different heights could be used. This arrangement can provide space for construction and maintenance.

As systems are replicated on both sides of the steam turbine, two mirrored designs (a pair of designs that are symmetrical to one another along the line of the steam turbine rotation axis, once installed) are needed for some components, such as the steam pipe systems. Other components (such as the first and second HRSGs) may be identical. In the case of the HRSGs, this is achieved by providing steam access points at a central location on the HRSGs, so that the same design can be used on both sides. As an alternative, mirrored designs can also be used for the first and second HRSGs, in which case the steam access points (the point where the steam pipe systems enter the HRSGs, see for example FIG. 2) do not need to be at a central location.

As mentioned above, the first HRSG 30 and second HRSG 40 may be identical (or substantially identical) or may be symmetrical designs. For identical designs in particular, the first and second steam pipe systems enter into the top of the first and second HRSGs respectively, specifically into a central point (central connection point) in the top in the y direction perpendicular to the steam turbine rotation axis (see for example FIG. 2). The y direction is normally also horizontal when the CCPP has been installed. Entry into a central point allows for the same design of HRSG to be used on both side of the steam turbine. The central point can additionally be at a central point in the x direction, although this is not essential, and the first and second HRSGs can still be identical with an offset from a central point in the x direction. An identical design does not imply that the first and second HRSGs must be absolutely identical to the tiniest detail, and minor or cosmetic details could be changed as appropriate; nevertheless, in the interests of simplicity, truly identical designs may be beneficial over designs with minor amendments.

The rearrangement of the CCPP means that there is generally a greater opportunity to share systems such as lubrication oil modules and fire-fighting modules between gas turbines, or between gas turbines and steam turbines. In previous designs, sharing of modules such as lubrication oil modules and fire-fighting modules in this way was not generally possible—the current design may therefore be beneficial due to a reduced need for duplicate systems. For systems where an auxiliary system is still needed for each HRSG, the auxiliary systems for the first HRSG can be of a mirrored design to those of the second HRSG. In general, though, it may be beneficial to have a single system design for auxiliary systems where possible, rather than two mirrored designs (two designs that are mirror images of one another). This can be achieved by providing central connection points.

As described with respect to central connection points for the steam pipe systems in the HRSGs, having a central connection point means that the connection point is arranged in the center in the y direction; that is, a direction perpendicular to the steam turbine rotation axis 22 and normally also horizontal. The central point can additionally be at a central point in the x direction.

The parts are shown in particular layouts in the examples above, such as the generator (G) followed by the HP steam turbine (ST) followed by the IP steam turbine in FIG. 2 (G-HP ST-IP ST). Various other layouts are also possible, such as G-IP ST-HP ST. Where a gas turbine (GT) is also provided, possible layouts include G-GT-HP ST-IP ST and GT-G-HP ST-IP ST. Where a low-pressure steam turbine or turbines are also provided, possible layouts include G-LP ST-IP ST-HP ST and G-HP ST-IP ST-LP ST-LP ST. It may be beneficial to include the LP ST at one end of the layout, as the steam pipe systems for LP ST systems can be very bulky. In particular, it may be beneficial if any LP ST is arranged so that it is not between the first and second HRSGs; that is, with the LP ST arranged so that it is outside the volume extending between the first and second HRSGs. This can allow the first and second HRSGs to be placed closer together, relative to designs where the LP ST is between the first and second HRSGs.

The layout is not limited to any particular steam turbines. When more than one steam turbine is provided, both may operate at the same pressure, or one may operate at a higher pressure than the other. When three steam turbines of different pressures are used, these are typically denoted high, intermediate and low pressure, where high pressure is higher than intermediate pressure, which is higher than low pressure. Where steam turbines of only two different pressures are used, these are called a high pressure steam turbine and an intermediate pressure steam turbine in this document.

The distance between a first steam turbine and a second steam turbine (such as the HP steam turbine and IP steam turbine of FIG. 2) may be varied during a design phase. In an embodiment, the high-pressure steam turbine 23 is adjacent to the high-pressure area 35 in the first heat recovery steam generator 30 and the high-pressure area 45 in the second heat recovery steam generator 40. In an embodiment, the intermediate-pressure steam turbine 24 is adjacent to the intermediate-pressure area 36 in the first heat recovery steam generator 30 and the intermediate-pressure area 46 in the second heat recovery steam generator 40. In some cases, such as when a second HRSG is added to an existing power plant, it may only be possible to have one or more of the areas 35, 36, 45, 46 adjacent. The parts are adjacent in that they are on the same line in a direction y perpendicular to the steam turbine rotation axis 22 (this can be seen when looking from above, as in FIG. 2 in particular). With this arrangement, the steam pipe systems 33, 34, 43, 44 can generally be made shorter than in an arrangement where the steam turbines and HRSGs are not placed adjacent to each other. Ideally, the pipes in the steam pipe systems extend mostly or only in this perpendicular direction, minimizing pipe lengths.

The gas turbine 60 includes a compressor 61, a combustor (not shown) and a turbine 62. Each gas turbine has an associated shaft. For each gas turbine, a generator may be provided on the shaft. Two gas turbines are shown in FIG. 3, one for each HRSG 30, 40, but in general one or more gas turbines may be provided, and a gas turbine may be connected to one or more HRSGs.

Various modifications to the embodiments described are possible and will occur to those skilled in the art without departing from the scope of the application, which is defined by the following claims.

What is claimed is:

1. A combined cycle power plant comprising:
   a steam turbine;
   a first heat recovery steam generator; and
   a second heat recovery steam generator, wherein
      the first heat recovery steam generator is attached to the steam turbine by a first steam pipe system , and the second heat recovery steam generator is attached to the steam turbine by a second steam pipe system to allow steam to pass from the first and second heat recovery steam generators to the steam turbine,
      the steam turbine is arranged in between the first heat recovery steam generator and the second heat recovery steam generator, and
      the first steam pipe system and the second steam pipe system define respective layouts that are symmetrically mirrored relative to one another with respect to a rotation axis of the steam turbine.

2. The combined cycle power plant of claim 1, wherein the first steam pipe system is attached to the first heat recovery steam generator at a central point of the first heat recovery steam generator, the point being central in a direction perpendicular to the steam turbine rotation axis, and
   the second steam pipe system is attached to the second heat recovery steam generator at a central point of the second heat recovery steam generator, the point being central in a direction perpendicular to the steam turbine rotation axis.

3. The combined cycle power plant of claim 1, wherein the steam turbine is a first steam turbine;
   the combined cycle power plant comprises a second steam turbine configured and arranged to work at a lower pressure than the first turbine;
   the first heat recovery steam generator comprises a first area and a second area, wherein the second area is configured and arranged to function at a lower pressure than the first area;
   the second heat recovery steam generator comprises a third area and a fourth area, wherein the fourth area is configured and arranged to function at a lower pressure than the third area;
   the first steam turbine is adjacent to the first area in the first heat recovery steam generator and the third area in the second heat recovery steam generator; and
   the second steam turbine is adjacent to the second area in the first heat recovery steam generator and the fourth area in the second heat recovery steam generator.

4. The combined cycle power plant of claim 3, wherein the first steam turbine is a high-pressure steam turbine;
   the second steam turbine is an intermediate-pressure steam turbine;
   the first area and second area of the first heat recovery steam generator are a high-pressure area and an intermediate-pressure area, respectively; and
   the third area and the fourth area of the second heat recovery steam generator are a high-pressure area and an intermediate-pressure area, respectively.

5. A combined cycle power plant according to claim 1, wherein the combined cycle power plant is a multi-shaft combined cycle power plant.

6. A combined cycle power plant according to claim 5, wherein the combined cycle power plant comprises:

a first gas turbine attached to the first heat recovery steam generator to allow exhaust gases from the gas turbine to flow to the first heat recovery steam generator; and a second gas turbine attached to the second heat recovery steam generator to allow exhaust gases from the gas turbine to flow to the second heat recovery steam generator, wherein the combined cycle power plant is arranged as a multi-shaft combined cycle power plant, with the steam turbine on a first shaft, the first gas turbine on a second shaft and the second gas turbine on a third shaft.

7. A combined cycle power plant comprising:

a steam turbine;

a first heat recovery steam generator;

a second heat recovery steam generator; and a generator connected to the steam turbine by a shaft extending between the generator and the steam turbine, wherein the first heat recovery steam generator is attached to the steam turbine by a first steam pipe system, and the second heat recovery steam generator is attached to the steam turbine by a second steam pipe system to allow steam to pass from the first and second heat recovery steam generators to the steam turbine, and the steam turbine is arranged in between the first heat recovery steam generator and the second heat recovery steam generator, wherein the first steam pipe system and the second steam pipe system define respective layouts that are symmetrically mirrored relative to one another with respect to a rotation axis of the steam turbine.

\* \* \* \* \*